UNITED STATES PATENT OFFICE.

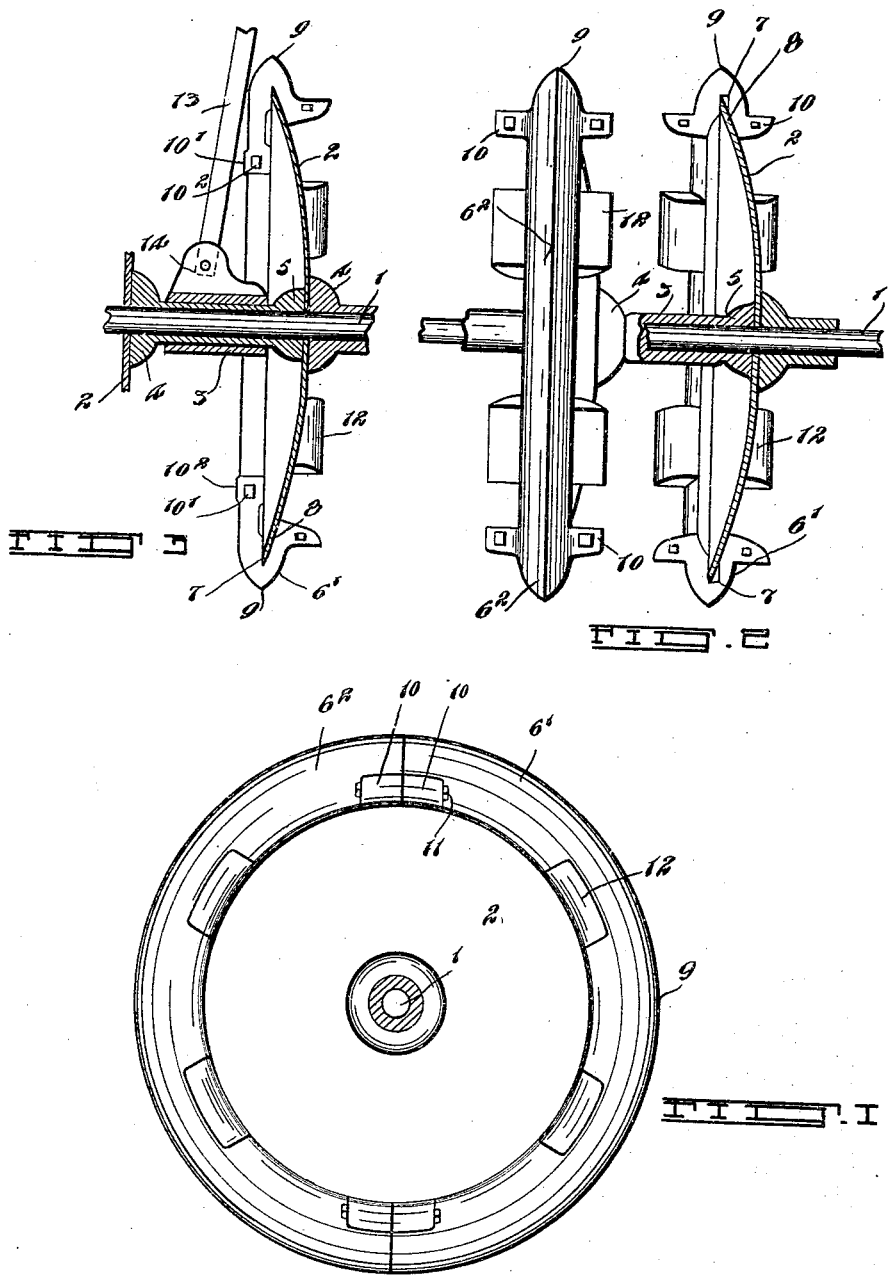

ALBERT E. SMITH, OF YORKTON, SASKATCHEWAN, CANADA.

LAND-PACKER.

954,653.  Specification of Letters Patent.  Patented Apr. 12, 1910.

Application filed June 15, 1909. Serial No. 502,348.

*To all whom it may concern:*

Be it known that I, ALBERT E. SMITH, of the town of Yorkton, in the Province of Saskatchewan, Canada, have invented certain new and useful Improvements in Land-Packers, of which the following is the specification.

My invention relates to a land packer and the object of the invention is to provide an attachment which can be applied to the usual form of disk harrow whereby the harrows are converted into land packers thereby avoiding the necessity of having two distinct and costly machines.

A further object is to provide a packer which can be used both as a surface and a sub-surface packer and which can be made to fit any form of disk harrow that is at present on the market.

The invention consists essentially in a rim formed of two sections adapted to be secured together and placed over the disk of a harrow, the parts being arranged and constructed as hereinafter more particularly described.

Figure 1 is a side elevation of a disk showing my invention applied. Fig. 2 is a front elevation of two disks on the harrow shaft both of such disks being fitted with my rim, one of them being shown in vertical section. Fig. 3 is a vertical sectional view through a disk on a harrow shaft showing a modified form of the rim employed to avoid interfering with the usual harrow tilting bar.

In the drawings like characters of reference indicate corresponding parts in each figure.

1 represents the main shaft on which the disks are secured, such shaft being of any desired type either round or square.

2 represents the harrow disks which are threaded on the shaft and spaced apart by the sleeves 3, such sleeves being each provided with enlarged ends 4 and 5, the ends 5 being designed to abut the concave faces of the disks and those 4 the convex faces. In this way each disk is held in a definite position on the shaft between the adjoining ends 4 and 5 of each successive pair of sleeves.

6 represents a cast iron or other such metallic rim which is formed in the present instance from two sections $6'$ and $6^2$, each section having its inner side fashioned at 7 so as to receive snugly the circumferential edge 8 of the disk, and its outer side gradually tapering to an edge at 9 which is designed to cut into the soil. The sections $6'$ and $6^2$ are provided each with lugs 10 which are cored out centrally so as to admit bolts 11 by which the sections can be fastened together securely when spaced around the disks.

12 are wings appearing on the sections, such wings extending outwardly from the faces of the rims and being all concentric to the shaft 1. Their purpose is to partially pack and pulverize the earth with which they come into engagement when the rim is rotated.

The lugs 10 are of the same form as the wings so that when two of them are brought together they fulfill the same purpose as a wing.

In the modified form of rim shown in Fig. 3 it will be seen that the lugs 10 at the left hand side of the post instead of being horizontally disposed are vertically disposed as at $10'$ so as to clear the ordinary tilting bar 13 of the usual disk harrow which is fastened to the shaft 1 by means of a sleeve 14. The lugs $10'$ of each section are fastened together by bolts in the same manner as are the lugs 10, the bolts passing through the openings $10^2$ provided.

What I claim as my invention is—

1. The combination with a disk of a sectional rim adapted to be detachably secured to the disk inclosing its circumferential edge and having extending wings thereon and adapted to contact with the ground, as and for the purpose specified.

2. The combination with a disk of a sectional rim adapted to be detachably secured to the disk inclosing its circumferential edge and having laterally extending wings thereon said wings being concentric with the shaft, as and for the purpose specified.

3. The combination with a disk of a harrow, of an inclosing rim for the disk comprising two or more sections having lugs formed thereon whereby the sections can be secured together by bolts passing through the lugs, said sections being provided with laterally extending wings, the wings and the lugs being similarly constructed on the outer face and located an equal distance from the center of the disk, as and for the purpose specified.

4. In a device of the class described, a rim designed to encircle the edge of a harrow disk and having wings extending laterally therefrom as and for the purpose specified.

Signed at Yorkton, in the Province of Saskatchewan, this 4th day of May 1909.

ALBERT E. SMITH.

In the presence of—
W. A. BOLAND,
M. MYRTLE WILSON.